United States Patent
Bystrov et al.

(10) Patent No.: US 9,600,879 B2
(45) Date of Patent: Mar. 21, 2017

(54) CONCURRENT DISPLAY OF MEDICAL IMAGES FROM DIFFERENT IMAGING MODALITIES

(71) Applicant: KONINKLIJKE PHILIPS N.V., Eindhoven (NL)

(72) Inventors: Daniel Bystrov, Hamburg (DE); Torbjorn Vik, Hamburg (DE); Heinrich Schulz, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 21 days.

(21) Appl. No.: 14/784,818

(22) PCT Filed: Apr. 17, 2014

(86) PCT No.: PCT/EP2014/057849
§ 371 (c)(1),
(2) Date: Oct. 15, 2015

(87) PCT Pub. No.: WO2014/170418
PCT Pub. Date: Oct. 23, 2014

(65) Prior Publication Data
US 2016/0055634 A1   Feb. 25, 2016

(30) Foreign Application Priority Data
Apr. 18, 2013   (EP) .................................. 13164244

(51) Int. Cl.
*G06K 9/00* (2006.01)
*G06K 9/36* (2006.01)
(Continued)

(52) U.S. Cl.
CPC .......... *G06T 7/0012* (2013.01); *G06F 3/0481* (2013.01); *G06T 5/50* (2013.01);
(Continued)

(58) Field of Classification Search
None
See application file for complete search history.

(56) References Cited

U.S. PATENT DOCUMENTS 5,801,773 A * 9/1998 Ikeda ..................... H04N 5/20
348/229.1
5,987,345 A 11/1999 Engelmann et al.
(Continued)

FOREIGN PATENT DOCUMENTS

| WO | 2009029671 A1 | 3/2009 |
| WO | 2010009040 A1 | 1/2010 |
| WO | 2010084390 A1 | 7/2010 |

OTHER PUBLICATIONS

Blume, H. R., et al.; Hard copies for digital medical images: an overview; 1995; Proc. SPIE 2413: Color Hard Copy and Graphic Arts IV, 206.

*Primary Examiner* — Randolph I Chu

(57) ABSTRACT

The present invention relates to a method for use in the concurrent display of medical images from different imaging modalities. A system and a computer program product for use in relation to the method are also disclosed. In the method, a primary image and a secondary image from a different imaging modality are fused. In the fused image, a first pixel group from the primary image having primary image data values within a first range are mapped to grayscale image values. A second pixel group from the primary image having primary image data values within at least a second range are identified, and the secondary image data values of corresponding pixels in the secondary image are mapped to color image values in the fused image.

14 Claims, 7 Drawing Sheets

(51) Int. Cl.
*G06K 9/40* (2006.01)
*G06T 7/00* (2006.01)
*G06T 5/50* (2006.01)
*G06F 3/0481* (2013.01)

(52) U.S. Cl.
CPC .. *G06T 7/0081* (2013.01); *G06T 2207/10072* (2013.01); *G06T 2207/10081* (2013.01); *G06T 2207/10088* (2013.01); *G06T 2207/10104* (2013.01); *G06T 2207/10116* (2013.01); *G06T 2207/10132* (2013.01); *G06T 2207/20104* (2013.01); *G06T 2207/20221* (2013.01); *G06T 2207/30004* (2013.01)

(56) References Cited

U.S. PATENT DOCUMENTS

| | | | |
|---|---|---|---|
| 6,825,884 B1 * | 11/2004 | Horiuchi | H04N 1/4074 348/222.1 |
| 6,993,171 B1 | 1/2006 | Choi | |
| 7,010,149 B1 | 3/2006 | Knoplioch et al. | |
| 7,313,261 B2 | 12/2007 | Dehmeshki | |
| 7,612,804 B1 * | 11/2009 | Marcu | G06T 5/50 348/222.1 |
| 8,115,836 B2 * | 2/2012 | Miyahara | H04N 5/2355 348/254 |
| 8,977,073 B2 * | 3/2015 | Kwon | G06T 5/50 382/162 |
| 2003/0095192 A1 * | 5/2003 | Horiuchi | H04N 5/235 348/222.1 |
| 2004/0047497 A1 | 3/2004 | Daw et al. | |
| 2012/0019548 A1 | 1/2012 | Zhu et al. | |
| 2012/0195486 A1 | 8/2012 | Kirenko | |

* cited by examiner

CONCURRENT DISPLAY OF MEDICAL IMAGES FROM DIFFERENT IMAGING MODALITIES

CROSS-REFERENCE TO PRIOR APPLICATIONS

This application is the U.S. National Phase application under 35 U.S.C. §371 of International Application No. PCT/EP2014/057849, filed on Apr. 17, 2014, which claims the benefit of European Patent Application No. 13164244.9, filed on Apr. 18, 2013. These applications are hereby incorporated by reference herein.

FIELD OF THE INVENTION

The invention relates to a method for use in the concurrent display of medical images from different imaging modalities. A system and a computer program product are also disclosed in relation to the method. The invention finds application in the field of medical imaging in general, and has particular application in the display of medical images in the fields of Computerised Tomography (CT), X-ray, Positron Emission Tomography (PET), Single Photon Emission Computed Tomography (SPECT), Magnetic Resonance (MR) and ultrasound.

BACKGROUND OF THE INVENTION

Medical imaging data is conventionally represented by a two- or a three-dimensional data set in which each pixel or voxel has a data value which relates to a physiologically significant aspect of an imaged region. In order to display a medical image the data values of a selection of the pixel or voxels are mapped to a two-dimensional array of image values. Each image value in the two-dimensional array typically represents the intensity of a color, or a grayscale intensity depending on the type of image to be displayed. Conventional display monitors used in the display of such medical images are typically capable of displaying a wide range of image values in both color and monochrome.

A limitation that arises in the display of such images however is that when the full range of data values in an image is mapped to the display monitor, physiological features which give rise to small changes in data values result in small changes in shade or color that may be hidden in the displayed image.

In X-ray for example, Hounsfield units (HU) are used to represent the radiological density of matter. Conventionally air has a radiological density of −1024 HU, water has a radiological density of 0 HU and that for bone may lie in the range 700 to around 3000 HU. Thus in order to display the full range Hounsfield units in a medical image, approximately 4000 discrete pixel values should be displayed. Conventionally such radiological images are displayed in grayscale. The human eye, however, is generally accepted as being capable of discerning a lower number of grayscale steps, or shades. At a typical display brightness values of 500 cd/m$^2$ an untrained eye is generally considered capable of discerning approximately 720 discrete grayscale steps (Digital Imaging and Communications in Medicine (DICOM), Part 14: Grayscale Standard Display Function, PS 3.14-2011, P11-15). A trained radiologist performs rather better and is typically considered capable of discerning between 800 and 1000 discrete levels (Blume H., Muka E., "Hard Copies for Digital Medical Images: an overview", Proc. SPIE 2413, Color Hard Copy and Graphic Arts IV, 206, Apr. 27, 1995). Therefore the concurrent displaying of all possible HU values as different shades results in some shades being indiscernible from others. Consequently image features giving rise to small changes in grayscale values may be hidden in images in which the full scale of HU values is displayed concurrently.

Similar issues arise in the display of medical images from other medical imaging fields including in CT, X-ray, PET, SPECT, MR and ultrasound in which the desire to display a wide range of data values leads to the hiding of image features that result from small changes in data values.

A conventional method of resolving these issues is to use the level-and-window technique in which data values within a particular range, determined by the width of a so-called window, and centered about a particular data value, the level, are mapped to the full range of pixel values available in a display. Data values at the lowest end of the range are typically mapped to black, and data values at the highest end of the range are typically mapped to white. The level and window may be adjusted in order to permit a user to dynamically focus on a particular physiologically-interesting range of data values, such as a bone window or a tissue window.

A drawback of the level and window technique is that a radiologist is frequently interested in several windows relating to different physiological ranges at the same time. The radiologist must then set-up different windows for each medical image. In one solution to this issue, U.S. Pat. No. 6,993,171B1 relates to a method of displaying colorized two-dimensional medical images of human anatomy and discloses a method of assigning a predetermined range of colors to computed tomography images for enhanced visualization. Each color band may be mapped to a distinct sub-range of radiological density values, the sub range being unique to a particular tissue type.

In another solution, patent application WO2010/009040A1 relates to a method for separating diagnostic content of x-ray images from non-diagnostic content in order to achieve an optimum image reproduction and windowing. In particular, embodiments are disclosed for displaying a plurality of radiological density images in a single image viewing window by overlaying gray scale images of each radiological density image in a single display window.

In the assessment of medical images a medical expert is frequently faced with a further desire to compare medical images from different imaging modalities. One imaging modality may for example show structural image features and a second imaging modality may for example show functional image features. By comparing the two images an improved diagnosis is achieved because the physical regions, such as the organs, to which the functional data relates, are more readily identified. In one method disclosed in patent application WO2010/084390 a second image is color coded with respect to an intensity spectrum with a portion of the intensity spectrum set to be transparent to generate a color coded second image. This image is combined with a first image to generate a fused image, and the fused image is displayed.

However, these solutions suffer from the drawback that when displaying medical images from different imaging modalities, some image features remain hidden, confounding image analysis.

SUMMARY OF THE INVENTION

It is an object of the invention to improve the display of image features in concurrently-displayed medical images that are characteristic of different imaging modalities. A method, a system and a computer program product are disclosed in relation to the invention.

This object is achieved in the present invention by the method in which a primary image and a secondary image from a different imaging modality are fused. In the fused image, a first pixel group from the primary image having primary image data values within a first range are mapped to grayscale image values. A second pixel group from the primary image having primary image data values within at least a second range are identified, and the secondary image data values of corresponding pixels in the secondary image are mapped to color image values in the fused image. Grayscale image values represent grayscale intensities and color image values represent the intensity of one or more colors.

The invention permits the display of features in a primary image associated with a particular grayscale range, allowing a user to concentrate attention on these grayscale image features. Outside this grayscale range the invention permits the display of a secondary image from a different imaging modality as a color image; advantageously permitting the concurrent display of the two images without the secondary image obscuring features in the grayscale image.

According to another aspect of the invention the method further includes the method step of displaying the medical image.

According to another aspect of the invention the primary image is a structural image and the secondary image is a functional image. Structural images, such as CT images, are often displayed in grayscale and consequently the use of a structural image as the primary image maybe used to display an image in a format with which a user is familiar, whilst using color to distinguish features relating to the secondary image, thereby improving diagnosis. According to another aspect of the invention the primary and secondary images are characteristic of different imaging modalities selected from the following group: CT, X-ray, PET, SPECT, MR, ultrasound.

According to another aspect of the invention the method step of identifying a first range comprises receiving user input indicative of the first range; and the method step of identifying at least a second range comprises receiving user input indicative of the at least a second range. By allowing a user to input such ranges, the user may determine which primary image features, characteristic of a particular primary image data value range, should be displayed, allowing a user to focus on those particular ranges. In one example the primary image may be a grayscale CT image having pixel data values in Hounsfield units. The user may be interested in only a bone window in the range 700 HU to 1000 HU, in which case the user may select only this range. The user input may be received from a keyboard or a mouse, for example. Alternatively a user may select a particular grayscale range from a grayscale color pallete displayed on a display using a slider bar.

According to another aspect of the invention the method step of identifying a first range comprises receiving user input indicative of the first range; and the at least a second range is defined by the one or more ranges of primary image data values above and/or below the first range. Thus the user may identify the first range of interest, and the second range and any further ranges are defined by the remaining range or ranges of primary image data values in the primary image data value range above or below or above and below the first range. Advantageously the user input procedure is simplified.

According to another aspect of the invention the lowest data value within the first range is mapped to black and the highest data value within the first range is mapped to white. In so doing the entire grayscale image value range is used for the display of the primary image. By using the entire grayscale image value range for the display of the first range, small changes in primary image data values become more apparent, and advantageously image features which were hidden in the original primary image may be seen by a user. This aspect of the invention corresponds to the level and window technique.

According to another aspect of the invention the secondary image data value of each corresponding pixel from the secondary image is mapped to a color image value representing the intensity of a single color selected from the group: red, orange, yellow, green, blue, indigo, violet. By mapping the secondary image value to a single color image value, secondary image features are readily distinguished from primary image features.

According to another aspect of the invention the method further includes the method step of registering the primary image with the secondary image within at least the region of interest. Advantageously the correspondence of features in the region of interest in the primary image and the secondary image are improved. Such registration is not an essential step since the primary and secondary images may be pre-registered, as is for example the case in concurrently acquired PET-CT images.

According to another aspect of the invention the method further includes the steps of: identifying a third range within the primary image data value range which is distinct from both the first range and the second range; selecting from the primary image a third pixel group of one or more pixels having a primary image data value within the third range; and, for each pixel in the third pixel group, mapping the secondary image data value of each corresponding pixel from the secondary image to a color image value representing the intensity of at least a first color; wherein the relationship between the color image value and the secondary image data value is described by a monotonic function. The third range may advantageously be used to outline a portion of the fused image that is to be displayed in grayscale, thereby clearly delineating it in the fused image. Additional ranges may likewise be used to delineate both the extreme upper and extreme lower limits to the data values in the grayscale image.

According to another aspect of the invention the first range is between the second range and the third range and both the second range and the third range are mapped to the same color. In so doing a fused image may be generated in which features are either displayed in grayscale, or in one single other color. By mapping the second range and the third range to the same color, a clearer fused image may be provided in which a user is prevented from distraction by superfluous colors.

According to another aspect of the invention the method further comprises the method step of receiving user input indicative of a position on the primary image, such as a cursor position, and the region of interest is defined by a predetermined shape encompassing the position on the primary image. By applying the mapping to a predetermined shape on the primary image, a user may focus analysis on that particular region without distraction.

According to another aspect of the invention the first range is determined by the range of values within the predetermined shape, and the at least a second range is defined by the one or more ranges of primary image data values above and/or below the first range. In so doing the first range is automatically updated to that within the predetermined shape as the position on the primary image is changed.

According to another aspect of the invention a system comprising one or more processors configured to perform one or more of the disclosed method steps is claimed. The system further comprises a display for displaying the fused image. Additional method steps disclosed in relation to the method may further be performed by the one or more processors.

According to another aspect of the invention a computer program product comprising computer executable instructions to perform the disclosed method steps is claimed. The computer program product may be a computer-readable storage medium, such as a floppy disc, a magnetic hard drive, a USB drive, an optical disc, ROM or RAM and furthermore the computer executable instructions may be downloadable.

DETAILED DESCRIPTION OF THE INVENTION

In order to improve the display of image features in concurrently-displayed medical images from different imaging modalities a medical image mapping method is disclosed. A system and a computer program product for use in relation to the method are also disclosed. The method is described with particular reference to an implementation in which the primary image is characteristic of a CT imaging modality and the secondary image is characteristic of an MR imaging modality, although it is to be appreciated that the invention has application in the display of medical images from different medical imaging modalities in general. The terminology characteristic-of an imaging modality refers to an image generated by an imaging modality, and further encompasses an image that has been generated by an imaging modality and subsequently processed in order to appear to have been generated by another imaging modality. For example an original MR image is characteristic of an MR imaging modality, and may be processed thus in order to appear characteristic of a CT imaging modality.

Figure 1:
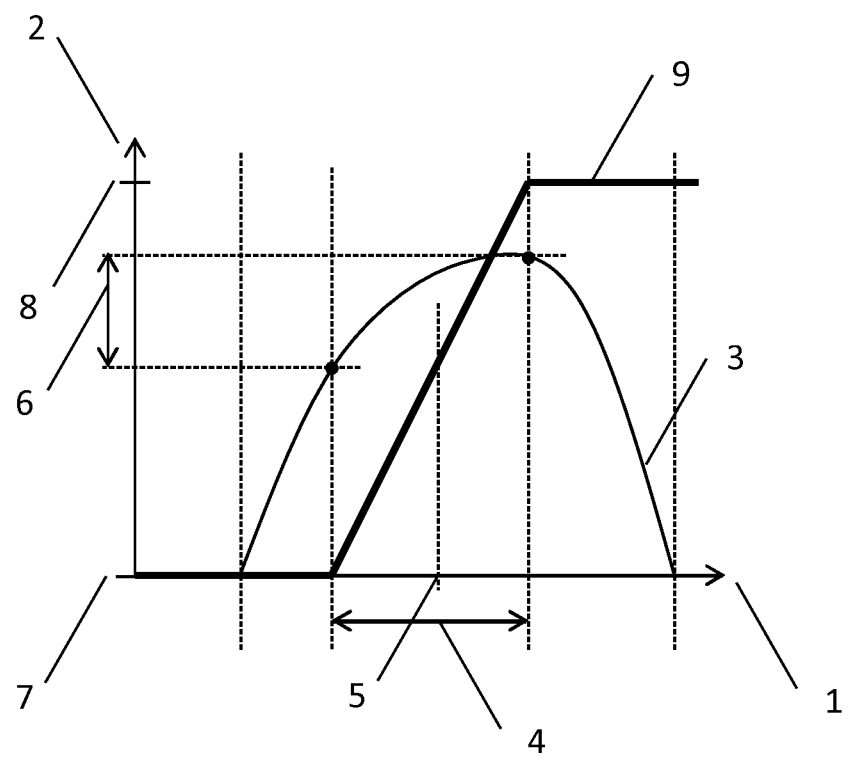
FIG. 1 illustrates a prior art medical image mapping method in which a plurality of data values 1 are mapped to a plurality of image values 2.

Conventionally, medical imaging data is represented by a two- or a three-dimensional data set in which each pixel or voxel has a data value which relates to a physiologically significant aspect of an imaged region. The data value may be an analogue value but is more conventionally digitized and represented by an n-bit word which may thus have one of $2^n$ discrete values which represent the data value with improved data integrity. In order to display a medical image the data values of a selection of the pixel or voxels are mapped to a two-dimensional array of image values. Each image value in the two-dimensional array typically represents the intensity of a color, or a grayscale intensity depending on the type of image to be displayed. Conventional computer monitors used in the display of such medical images are typically capable of displaying a wide range of pixel values in both color and monochrome. 12-bit monochrome displays are currently available, although conventionally 10-bit monochrome displays offering 1024 levels of grayscale are more commonly used. The mapping may for example be carried out by a processor executing a function relating pixel data values to image values, or a lookup table FIG. 1 illustrates a prior art medical image mapping method in which a plurality of data values 1 are mapped to a plurality of image values 2. The data values 1 may for example represent X-ray absorption in a CT image and the image values 2 may for example represent grayscale intensity. In this prior art mapping method known as level and window, the distribution of pixel data values in an image are represented by pixel data value histogram 3, within which a user is interested in a particular "window" 4 centered about a data value "level" 5. The window may have particular physiological interest and give rise to a range of grayscale values 6 which may be less than the full scale of available image values between black 7 and white 8. In order to improve the grayscale contrast between data values within the window 4, the lowest data value in the window is conventionally mapped to black 7 and the highest data value mapped to white 8 using a linear mapping function 9. Data values at and below the lowest data value in the window are consequently mapped to black and those at and above the highest data value are mapped to white.

Figure 2:
FIG. 2 illustrates a prior art grayscale CT medical image resulting from the level and window technique.

FIG. 2 illustrates a prior art grayscale CT medical image resulting from the level and window technique. The CT image illustrates a cross section through the abdomen positioned above a patient table.

Whilst the level and window technique allows the user to concentrate on a particular range of data values in detail, a drawback of level and window recognized by the present inventors is that image features outside the window are hidden because they are mapped to either black or to white.

Figure 3:
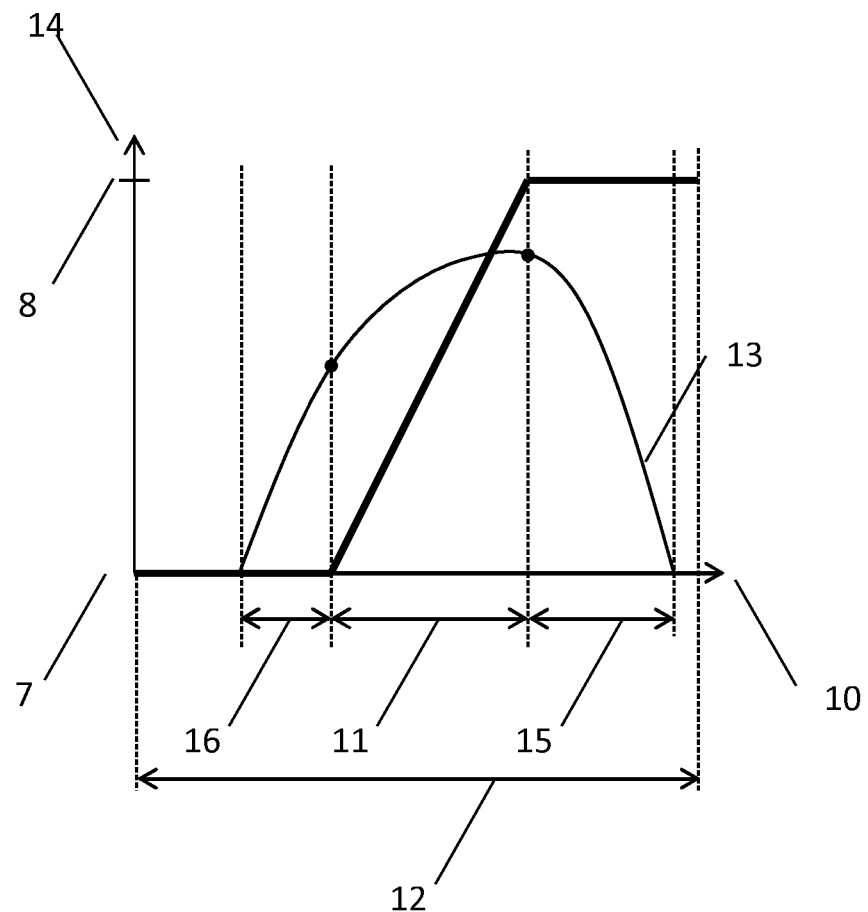
FIG. 3 illustrates a medical image mapping method in accordance with certain aspects of the invention.

FIG. 3 illustrates a medical image mapping method in accordance with certain aspects of the invention. With reference to FIG. 3, a primary image characteristic of a first imaging modality and having a region of interest, comprises a plurality of pixels wherein each pixel has a primary image data value 10 within a primary image data value range 12. The region of interest may have primary image data values within only a portion of the entire primary image data value range 12 as indicated by pixel data value histogram 13, or alternatively the pixel data values may span the entire primary image data value range. The primary image data values represent physiologically significant parameters characteristic of the primary imaging system, which may for example be a CT, an X-ray, a PET, a SPECT, an MR or an ultrasound imaging system. In a preferred embodiment the primary imaging system is a CT imaging system and the primary image data values represent the radiological density of voxels in a CT dataset. In FIG. 3 a first range 11 of primary image data values 10 from a primary medical image are mapped to grayscale image values 14.

Figure 4:
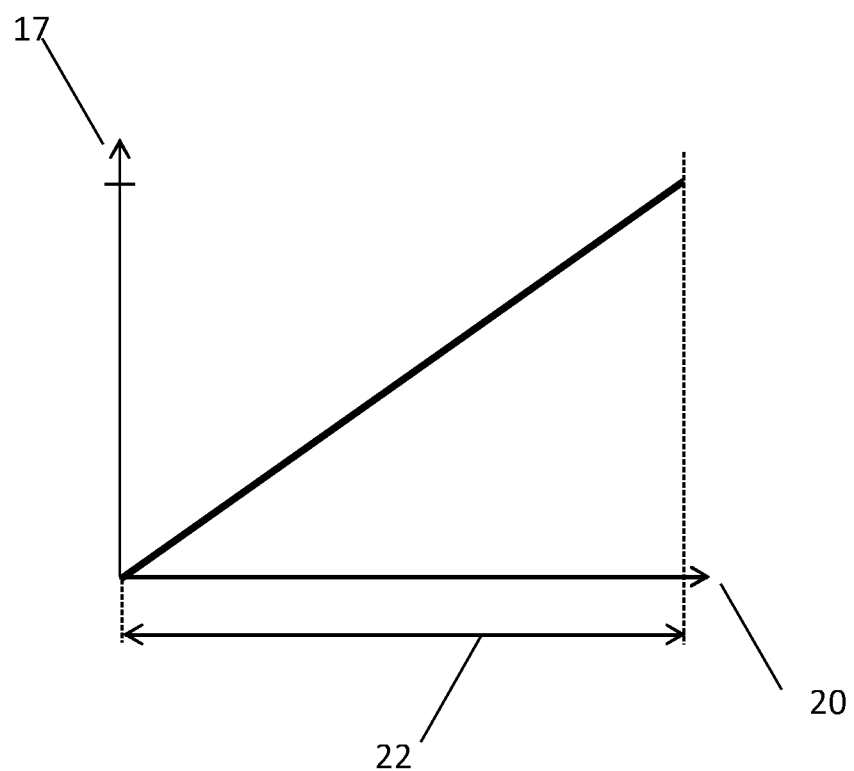
FIG. 4 illustrates a medical image mapping method in accordance with certain aspects of the invention.

FIG. 4 illustrates a medical image mapping method in accordance with certain aspects of the invention. The mapping method illustrated in FIG. 3 may be used in combination with the mapping method illustrated in FIG. 3. With reference to FIG. 4, a secondary image characteristic of a different imaging modality to the first imaging modality, and corresponding to at least the region of interest; comprises a plurality of pixels wherein each pixel has a secondary image data value 20 within a secondary image data value range 22. FIG. 4 illustrates a mapping between secondary image data values 20 and color image values 17. In at least the region of interest, pixels from the secondary image correspond to pixels from the primary image. The secondary image may be characteristic of any imaging modality with the condition that it is different to the first imaging modality, and may be for example a CT, an X-ray, a PET, a SPECT, an MR or an ultrasound imaging system. The secondary image data value range 22 may therefore be different to the primary image data value range 12. In a preferred embodiment the secondary image is characteristic of an MR imaging system and the secondary image data value range is expressed in arbitrary units.

The method of the invention comprises fusing the primary image with the secondary image to create a fused image. Optionally the method includes the step of registering the primary image with the secondary image in order to improve the correspondence of features in the region of interest.

The combination of FIG. 3 and FIG. 4 illustrate a first embodiment of the invention. With reference to FIG. 3 and FIG. 4, in at least in a region of interest, each pixel in the fused image has an image value determined according to the method steps of: i) identifying a first range 11 within the primary image data value range 12 which is narrower than the primary image data value range 12; ii) selecting from the primary image a first pixel group of one or more pixels having a primary image data value within the first range 11; iii) mapping the primary image data value 10 of each pixel from the first pixel group to a grayscale image value 14 representing a grayscale intensity wherein the relationship between the grayscale image value 14 and the primary image data value 10 is described by a monotonic function; iv) identifying at least a second range 15, 16 within the primary image data value range 12 which is distinct from the first range 11; v) selecting from the primary image a second pixel group of one or more pixels having a primary image data value within the at least a second range 15, 16; vi) for each pixel in the second pixel group, mapping the secondary image data value 20 of each corresponding pixel from the secondary image to a color image value 17 representing the intensity of at least a first color, wherein the relationship between the color image value 17 and the secondary image data value 20 is described by a monotonic function.

Consequently, pixels from the primary image having a primary image data value within the first range are, in the fused image, mapped to grayscale image values; and pixels from the second pixel group have their secondary image data values mapped to color image values in the fused image.

Figure 5:
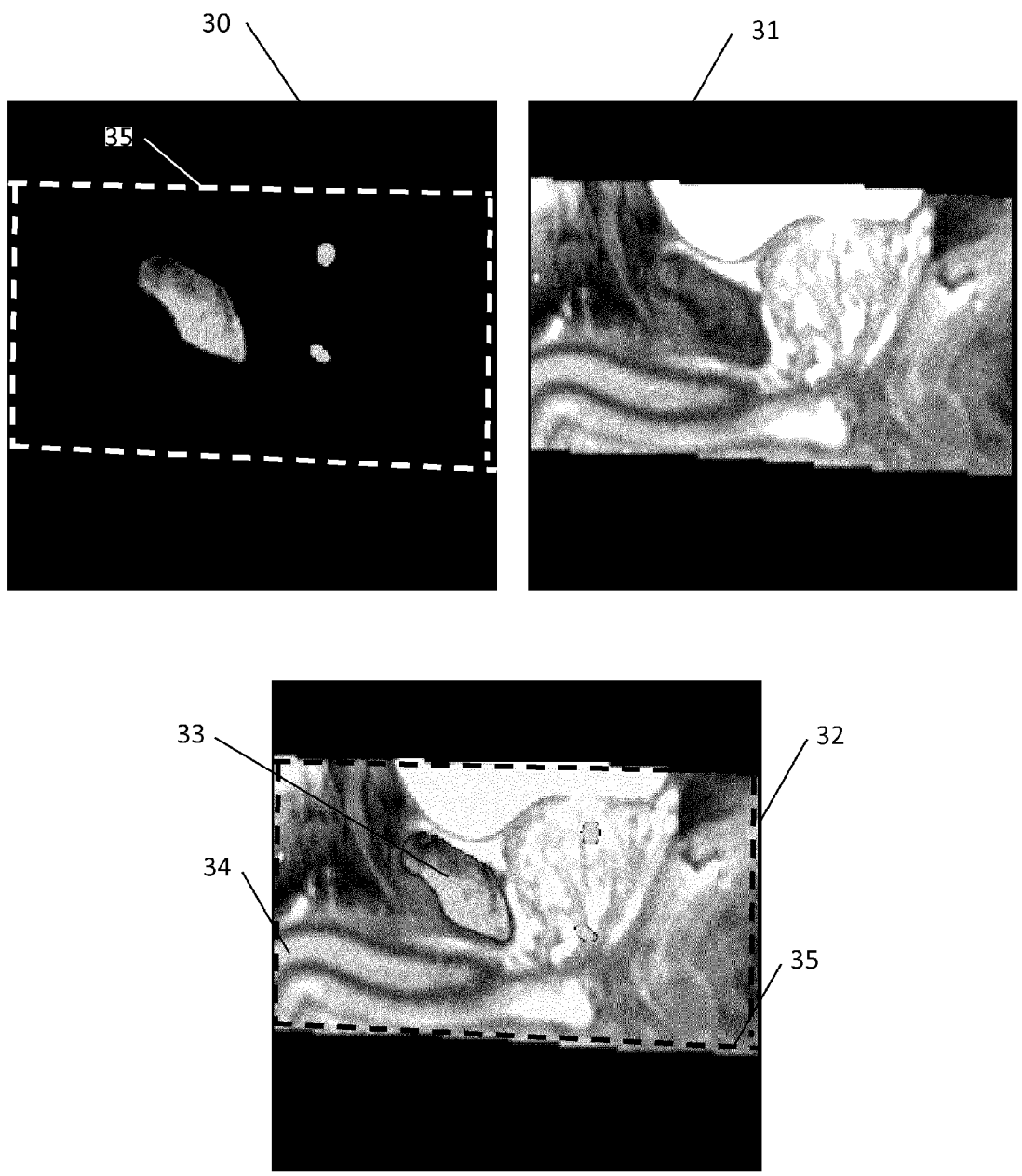
FIG. 5 illustrates a primary image 30, a secondary image 31, and a fused medical image 32 in accordance with certain aspects of the invention.

FIG. 5 illustrates a primary image 30, a secondary image 31, and a fused medical image 32 in accordance with certain aspects of the invention.

In FIG. 5 primary image 30 has a region of interest 35 defined as the region within the dashed lines and is characteristic of a CT imaging modality. In the specific example in FIG. 5, primary image 30 relates to a pelvic CT dataset in which primary image data values in the range −200 HU to +200 HU are displayed in grayscale. The region of interest may in general be any portion of the primary image, such as a predefined area of the image, or a region corresponding to an organ for example, or indeed the entire primary image. Secondary image 31 in FIG. 5 is characteristic of an MR imaging modality. In the specific example in FIG. 5, secondary image 31 represents a pelvic MR dataset. In at least the region of interest 35, primary image 30 and secondary image 31 are fused to produce fused image 32. Advantageously, grayscale image value region 33 is distinguishable from color image value region 34, which allows a user to focus attention on image features in the primary image without the view being obscured by features from the secondary image. In fused image 32 in FIG. 5, primary image data values in the range −200 HU to +200 HU are displayed in grayscale, and outside this range, yellow color image values corresponding to secondary image values from secondary image 31 are displayed.

In the preferred embodiment illustrated in FIG. 3, three ranges 11, 15 and 16 are identified and these are contiguous such that pixels in the primary image region of interest are assigned to either the first pixel group or to the second pixel group. In the preferred embodiment illustrated in FIG. 3, the first pixel group comprises pixels within the first range 11, and the second pixel group comprises the combination of pixels from both the second range 15 and the third range 16. There may alternatively be only a first range 11 and a second range 15; for example if the first range lies at one extreme end of the primary image data value range 12 and the second range 15, is a contiguous range lying above or below the first range. In this case the first pixel group comprises pixels within the first range 11, and the second pixel group comprises pixels from the second range 15. Alternatively the two or more ranges may be non-contiguous, and pixels in the region of interest that are not identified as belonging to the first range 11 or to the second and further ranges 15, 16 are, in the fused image, mapped to black or to white, or to a color image value. Advantageously the use of such non-contiguous ranges permits the display of one or more contours around grayscale image features in the first pixel group having data values within the first range 11. Likewise there may also be additional ranges of primary image data values not shown in FIG. 3 that are treated in the same manner, and these may or may not be contiguous.

The identification of the first range 11 within the primary image data value range 10 may be predetermined and thus carried out automatically or carried out by receiving user input indicative of the range. In a predetermined configuration the first range 11 indicative of for example primary image Hounsfield Units data values indicative of a bone window is thus identified in the absence of user input. Alternatively, user input from for example a keyboard or a mouse may be used to identify a first range of interest. In one example the primary image data values are indicative of Hounsfield unit X-ray absorption in a CT image and different tissue types may be selected for display in grayscale by clicking a mouse on a tissue-type icon on a display. In another example, input from a keyboard is used to determine the numerical value of the first range of interest, or a slider control is used to determine this range.

After the first range 11 has been identified, a first pixel group of one or more pixels having a primary image data value within the first range are selected. In a preferred embodiment the selection is automatic and permits the pixels to be treated together as a group. The selection may involve automatically setting a pixel identifier code to a specific value indicative of the pixel belonging to the first pixel group.

The mapping of each pixel from the first pixel group to a grayscale image value is exemplified by the embodiment shown in FIG. 3. The grayscale image value represents grayscale intensity, so that when displayed on a display the user sees a grayscale shade which corresponds to the primary image data value. Within the first range 11 the mapping between the primary image data values 10 and the grayscale image values 14 is determined by a monotonic function as illustrated in FIG. 3, which may be carried out using for example a processor-executed software function or lookup table. In a preferred embodiment the monotonic function is a linear function such that the grayscale image value 14 depends linearly on the primary image data value 10. Furthermore the mapping preferably maps the lowest data value within the first range to black 7 and maps the highest data value within the first range to white 8 as shown in FIG. 3. However other monotonic functions are also contemplated in which the lowest and highest values are not necessarily mapped to black and white. In one contemplated example the first range 11 is mapped to a subsection of grayscale values between black and white. In one contemplated example the grayscale image values comprise a range of discrete steps having different grayscale intensities wherein primary image data values within a predetermined range are mapped to each grayscale value. In one example primary image data values 10 are represented by a 10-bit word which may therefore take on one of 1024 values wherein each data value is mapped to a corresponding value in a 10-bit grayscale image value 14. In another example primary image data values 10 are represented by a 10-bit word and grayscale image values 14 are represented by an 8-bit word, wherein consecutive blocks of 4 data values in the data value are mapped to the same grayscale image value.

The identification of at least a second range within the primary image data value range may be predetermined and thus carried out automatically, or carried out by receiving user input indicative of the range. In one example a predetermined configuration a second range is automatically determined based on the first range; wherein for example the second range 15 is taken to comprise the remaining values in the primary image data value range 12 above the first range, and the third range 16, if present, is taken to comprise the remaining values in the primary image data value range 12 below the first range. Thus the at least a second range is defined by the one or more ranges of primary image data values above and/or below the first range. In another envisaged predetermined configuration a second range is automatically determined based on the first range wherein the second range is separated from the first range by one or more data values which are mapped to a color or to black or to white in order to identify a contour around a portion of a grayscale image, and the third range 16 may be likewise non-contiguous to the first range in order to identify another contour around a portion of a grayscale image. In one example configuration in which the second range is determined in response to user input, user input is received as disclosed in relation to the identification of the first range 11 for determining the second range.

When the second range 15, and any further ranges have been identified, a second pixel group of one or more pixels having a primary image data value within the at least a second range are selected. In a preferred embodiment the selection is automatic and advantageously permits the pixels to be treated together as a group. The selection may for example involve automatically setting a pixel identifier code to a specific value indicative of the pixel belonging to the first pixel group.

Figure 6:
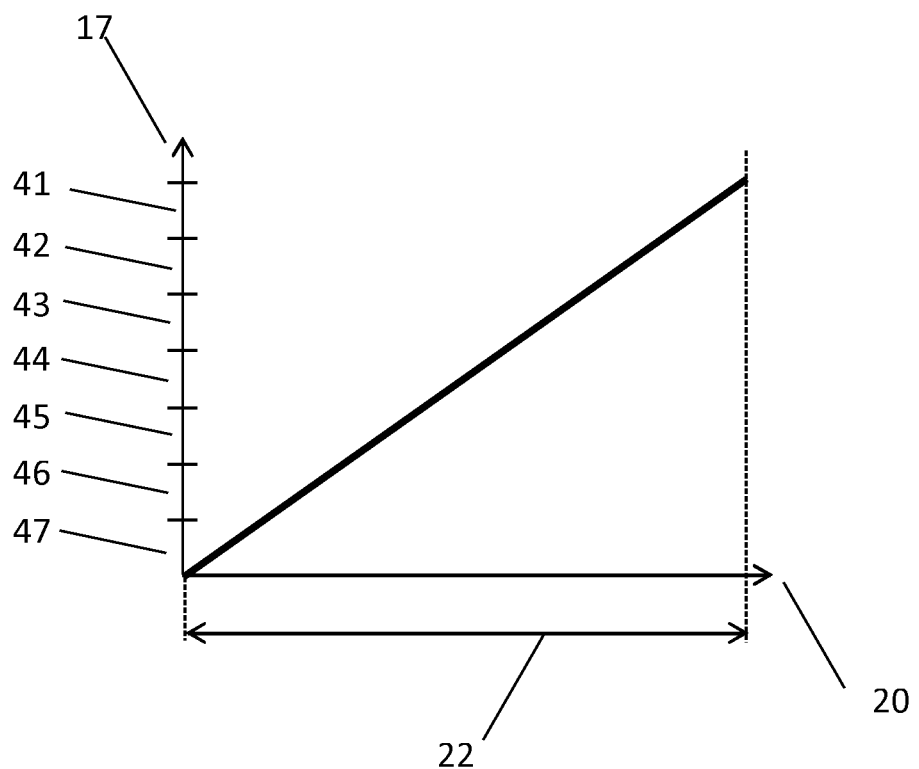
FIG. 6 illustrates an exemplary mapping between secondary image data values 20 and a plurality of colors 41, 42, 43, 44, 45, 46, 47.

The mapping of each pixel from the second pixel group to a color image value is exemplified by the embodiment shown in FIG. 4 in which the mapping between secondary image values 20 and color image values 17 is determined by a monotonic function. The color image value 17 represents the intensity of one or more colors, so that when presented on a display the user sees a color whose intensity corresponds to the secondary image data value 20. In a preferred embodiment the color image value represents the intensity of a single color which may be exemplarily selected from the group red, orange, yellow, green, blue, indigo, violet, wherein the relationship between the secondary image data values 20 and the color image value 17 is a linear function. In this way the intensity of the color image value 17 gradually changes with secondary image data value 20. Other monotonic mapping functions as disclosed in relation to the grayscale image mapping may alternatively be used. Other colors may alternatively be represented by color image values 17. FIG. 6 illustrates an exemplary mapping between secondary image data values 20 and a plurality of colors 41, 42, 43, 44, 45, 46, 47. Colors 41, 42, 43, 44, 45, 46, 47 may be red, orange, yellow, green, blue, indigo, violet, although other colors, and mappings to a different number of colors are also contemplated. The color mapping described by FIG. 6 may be used in combination with the grayscale mapping described above to produce the fused image. In FIG. 6 a range of secondary image data values 20 may be mapped to the same color. The color may have the same intensity for each mapped data value, or alternatively the intensity within a particular color may depend further upon the data value. In one example secondary image data values 20 are represented by a 10-bit word which may therefore take on one of 1024 values wherein data values in the range 0 to 100 are represented by the color violet having the same intensity. In another example secondary image data values 20 are likewise represented data values in the range 0 to 100 are represented by the color violet wherein the intensity of the violet increases with the data value throughout the range 1 to 100. The intensities of other color image values may be represented likewise.

Optionally the method of the invention further includes the method step of displaying the fused image. The fused image may for example be displayed on a monitor, a visual display unit, or printed by a printer and the like.

Optionally, image values corresponding to primary image data values, to secondary image data values, or to an overlay of a primary image over a secondary image with a partially-transparent overlaid image, or to an overlay of a secondary image over a primary image with a partially-transparent overlaid image, or to any predetermined color or to black or to white may be used in the fused image to represent the region beyond the region of interest. In fused image 32 in FIG. 5, black is exemplarily used to represent the region beyond the region of interest 35.

The mapping method described above is applied to at least a region of interest in the primary image in order to generate the fused image. As described above, the region of interest may be the entire primary image, or only a portion of the primary image. In one embodiment the region of interest is a predefined area of the primary image. In this embodiment the method further comprises the method step of receiving user input indicative of a position on the primary image; and the region of interest is defined by a predetermined shape encompassing the position on the primary image. The position may for example be the position of a pointer on a display monitor, such as a mouse pointer, and the predetermined shape may for example be a circle or a square, or any shape encompassing the pointer. Preferably the pointer is a mouse pointer and the shape is a circle having a predetermined radius and is centered on the pointer. Thus only the corresponding portions of the primary and secondary images within the predetermined radius of the mouse pointer on the primary image are mapped as described in the fused image. By mapping only the regions within the region of interest a user may advantageously focus attention on a particular region of the fused image, thereby improving diagnosis.

Figure 7:
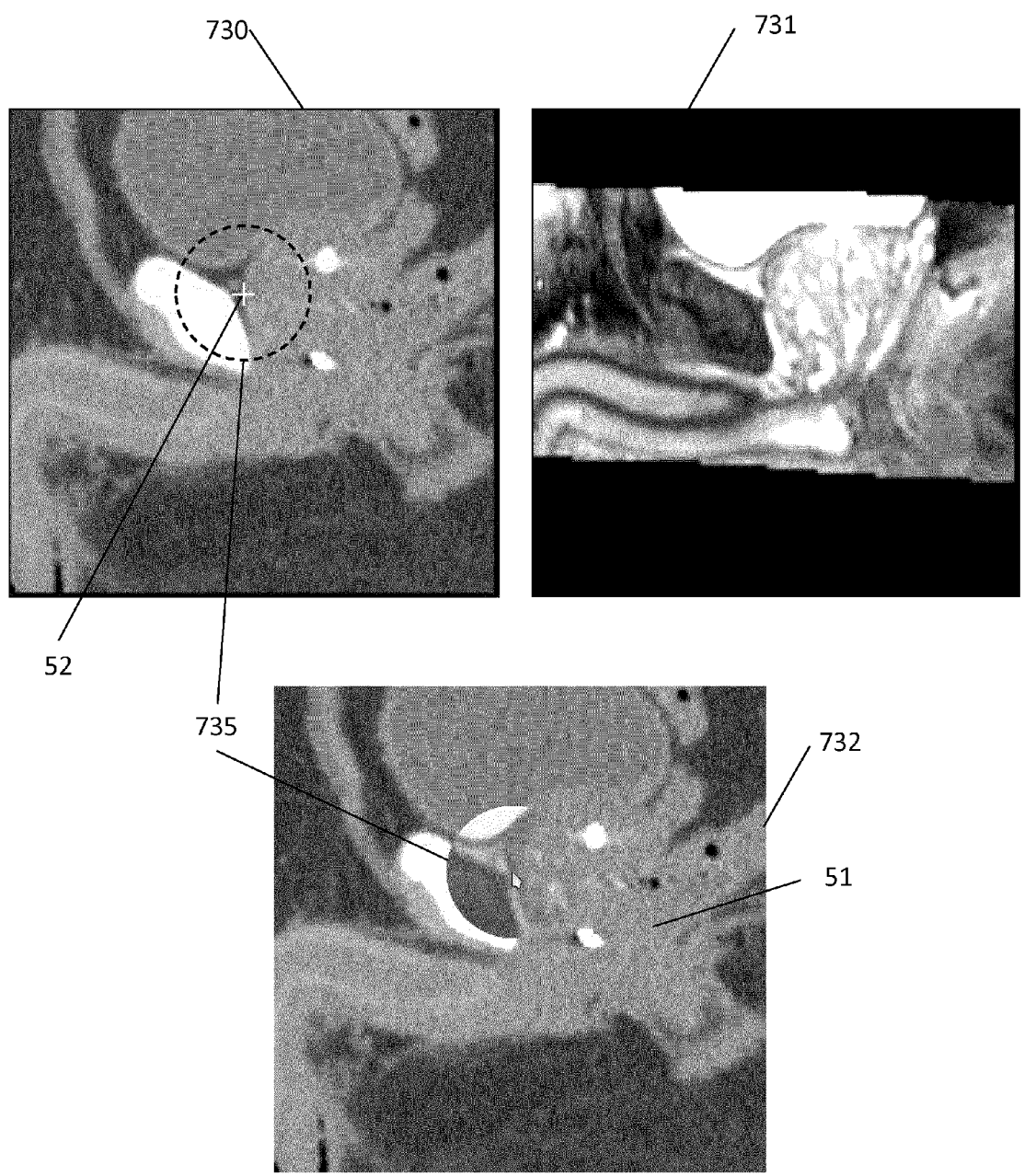
FIG. 7 illustrates a primary image 730, a secondary image 731, and a fused medical image 732 in which a mapping is applied to a region of interest 735 that is defined by a predetermined shape encompassing a position 52 on the primary image.

When the region of interest is defined by a predetermined shape encompassing the position on the primary image, optionally the first range may be identified by assigning the lowest primary image data value in the primary image within the predetermined shape to the lowest value of the first range and assigning the highest primary image data value in the primary image within the predetermined shape to the highest value of the first range. Furthermore the at least a second range may be defined by the one or more ranges of primary image data values above the first range, or the one or more ranges below the first range, or those above and below the first range. In so doing the first range is determined by primary image data values within the predetermined shape on the first image. Advantageously the user need not manually input the first range, which improves workflow. Furthermore the at least two ranges are automatically updated if the position on the primary image is changed. In one example implementation the lowest data value within the first range is furthermore mapped to black and the highest data value within the first range is furthermore mapped to white. In so doing the entire grayscale image value range is used for the display of the primary image within the predetermined shape encompassing the position on the primary image, thereby allowing a user to focus on a particular grayscale range in more detail. FIG. 7 illustrates a primary image 730, a secondary image 731, and a fused medical image 732 in which a mapping is applied to a region of interest 735 that is defined by a predetermined shape encompassing a position 52 on the primary image. Beyond 51 the region of interest 735 in FIG. 7, primary image data values are mapped to grayscale image values which correspond to the primary image data values. Advantageously the mapping permits a user to focus on the region of interest 735 whilst image features beyond the region of interest provide additional context for the focused attention.

As described above, image values corresponding to primary image data values, to secondary image data values, or to an overlay of a primary image over a secondary image with a partially-transparent overlaid image, or to an overlay of a secondary image over a primary image with a partially-transparent overlaid image, or to any predetermined color or to black or to white may be used in the fused image to represent the region beyond the region of interest.

One or more of the described method steps may be carried out by one or more processors configured to perform the described method steps in a system. The system may further comprise a display for displaying the fused image.

To summarize, a method for improving the display of image features in concurrently-displayed medical images from different imaging modalities has been described. In the method, a primary image and a secondary image from a different imaging modality are fused. In the fused image, a first pixel group from the primary image having primary image data values within a first range are mapped to grayscale image values. A second pixel group from the primary image having primary image data values within at least a second range are identified, and the secondary image data values of corresponding pixels in the secondary image are mapped to color image values in the fused image. Particular reference has been made to a fused image in which a primary image characteristic of a CT imaging system is fused with a secondary image from an MR imaging system, although it is to be appreciated that the method also finds application in the display of medical images characteristic of different imaging systems in general.

Whilst the invention has been illustrated and described in detail in the drawings and foregoing description, such illustrations and description are to be considered illustrative or exemplary and not restrictive; the invention is not limited to the disclosed embodiments and can be used in the display of medical images from different imaging modalities in general.

The invention claimed is:

1. A medical image mapping method; the method comprising the steps of:
   receiving a primary image having a region of interest the primary image comprising a plurality of pixels wherein each pixel has a primary image data value within a primary image data value range wherein the primary image is characteristic of a first imaging modality;
   receiving a secondary image corresponding to at least the region of interest the secondary image comprising a plurality of pixels wherein each pixel has a secondary image data value within a secondary image data value range; wherein the secondary image is characteristic of a different imaging modality to the first imaging modality;
   fusing the primary image with the secondary image to create a fused image comprising a plurality of pixels;
   wherein for at least the region of interest pixel in the fused image has an image value determined by:
   identifying a first range within the primary image data value range wherein the first range is narrower than the primary image data value range;
   selecting from the primary image a first pixel group of one or more pixels having a primary image data value within the first range;
   mapping the primary image data value of each pixel from the first pixel group to a grayscale image value representing a grayscale intensity wherein the lowest data value within the first range is mapped to black and the highest data value within the first range is mapped to white and wherein the relationship between the grayscale image value and the primary image data value is described by a monotonic function;
   identifying at least a second range within the primary image data value range which is distinct from the first range;
   selecting from the primary image a second pixel group of one or more pixels having a primary image data value within the at least a second range;
   for each pixel in the second pixel group, mapping the secondary image data value of each corresponding pixel from the secondary image to a color image value representing the intensity of at least a first color; wherein the relationship between the color image value and the secondary image data value is described by a monotonic function.

2. A medical imaging mapping method according to claim 1 wherein the method further comprises the method step of receiving user input indicative of a position on the primary image; and wherein the region of interest is defined by a predetermined shape encompassing the position on the primary image.

3. A medical image mapping method according to claim 2 wherein: the first range is identified by: assigning the lowest primary image data value in the primary image within the predetermined shape to the lowest value of the first range and assigning the highest primary image data value in the primary image within the predetermined shape to the highest value of the first range; and wherein the at least a second range is defined by the one or more ranges of primary image data values above and/or below the first range.

4. A medical image mapping method according to claim 1 further including the method step of displaying the fused image.

5. A medical image mapping method according to claim 1 wherein the primary image is a structural image and the secondary image is a functional image.

6. A medical image mapping method according to claim 1 wherein the primary image and the secondary image are characteristic of different imaging modalities selected from the following group: CT, X-ray, PET, SPECT, MR, ultrasound.

7. A medical image mapping method according to claim 1 wherein: the method step of identifying a first range comprises receiving user input indicative of the first range; and wherein the method step of identifying at least a second range comprises receiving user input indicative of the at least a second range.

8. A medical image mapping method according to claim 1 wherein: the method step of identifying a first range comprises receiving user input indicative of the first range; and wherein the at least a second range is defined by the one or more ranges of primary image data values above and/or below the first range.

9. A medical image mapping method according to claim 1 wherein the secondary image data value of each corresponding pixel from the secondary image is mapped to a color image value representing the intensity of a single color selected from the group: red, orange, yellow, green, blue, indigo, violet.

10. A medical image mapping method according to claim 1 further including the method step of registering the primary image with the secondary image within at least the region of interest.

11. A medical image mapping method according to claim 1 further comprising the method steps of:
identifying a third range within the primary image data value range which is distinct from both the first range and the second range; the method further including the method steps of:
selecting from the primary image a third pixel group of one or more pixels having a primary image data value within the third range;
for each pixel in the third pixel group, mapping the secondary image data value of each corresponding pixel from the secondary image to a color image value representing the intensity of at least a first color; wherein the relationship between the color image value and the secondary image data value is described by a monotonic function.

12. A medical image mapping method according to claim 11 wherein the first range is between the second range and the third range and both the second range and the third range are mapped to the same color.

13. A system for mapping medical images; the system comprising one or more processors configured to perform the method steps of claim 1; the system further comprising a display for displaying the fused image.

14. A non-transitory computer readable medium comprising computer executable instructions to perform the method steps of claim 1.

* * * * *